Patented Mar. 28, 1933

1,902,832

UNITED STATES PATENT OFFICE

PAUL CALDWELL, OF QUINCY, ILLINOIS, ASSIGNOR TO MOORMAN MANUFACTURING COMPANY, OF CHICAGO, ILLINOIS, A CORPORATION OF ILLINOIS

MINERAL FEED

No Drawing.　　　Application filed October 29, 1931. Serial No. 571,855.

The present invention relates to the treatment of rock phosphate, and has particular reference to the production of mineral feed therefrom.

In the prior art raw phosphatic materials such as Tennessee and Montana rock phosphates have been widely used for the preparation of phosphorus and commercial compounds thereof and for fertilizing purposes. The possibility of utilizing rock phosphates as a constituent of mineral feeds has also been recognized, but the toxic character of the raw rock phosphate, cost of refining, and the problem of palatability have prevented rock phosphate and the products thereof from attaining commercial success as an animal food.

A primary object of the present invention is the production from rock phosphate of an animal food which is substantially free of toxic constituents.

An additional object is the production of a mineral feed for animals which is palatable and which contains a high percentage of phosphorus.

Still another object is an economical and effective process for producing refined rock phosphate.

These and other objects will become apparent from a consideration of the following description.

The methods employed heretofore for the treatment of rock phosphate vary considerably, but have as a common characteristic the addition of some chemical reagent which will react with the constituents of the rock phosphate to convert the same into the desired form.

In one well known method which finds particular utility in the production of phosphoric acid, silica and carbon are added to the rock phosphate and the mixture heated to about 1300° C., whereupon a chemical reaction takes place.

In the production of fertilizers, the rock phosphate is ordinarily treated with an acid, such as sulphuric acid, or with an inorganic salt, which reacts with the phosphatic material to convert the latter into citrate soluble form when the mixture is heated to a sufficiently high temperature.

Rock phosphates, such as those obtained from Tennessee and Montana, contain around 3 to 4 per cent fluorine, ordinarily considered to be in the form of calcium fluoride, which has a pronounced toxic effect upon animals. When the rock phosphate is treated with an acid or acid salt, the calcium fluoride is ordinarily broken up and the fluorine evolved as a gas during the heat treatment of the material. In Rupp Patent, No. 1,637,428, it is suggested that a product of this type be employed as a mineral feed.

In accordance with my invention, a highly palatable phosphatic mineral feed which is free from toxic quantities of fluorine is produced by heating finely ground rock phosphate to a temperature of 1405° C. to 1450° C. in the presence of an excess of oxygen and without the addition of chemical reagents, such as silica, acids, and inorganic salts.

The rock phosphate may be finely ground so that 80 per cent will pass through a 200 mesh screen, mixed with about 6 per cent of powdered charcoal or other form of carbon, and charged to a sintering pan. It is preferred to wet the powdered mixture prior to heating the same in order to keep down dust losses. The water also helps to give the mass a more definite structure and permits the passage of the burning zone downwardly through the mass in a relatively slow and even manner. The carbon is ignited and the phosphatic material raised to a sintering temperature. During the heat treatment an excess of air is passed through the mass of material. By properly regulating the temperature, time of treatment and the amount of air, it is possible to obtain an ecru or straw-colored and coherent mass of sintered material having an extremely high porosity which may be of the order of 75 per cent voids. In composition, the material is composed of small particles fritted together to form a mass which is friable, brittle and pulverulent, but of sufficient rigidity to maintain its coherent form unless friction or pressure is exerted upon it. Gases may be passed through the material quite easily, and consequently it is in a form particularly adapted to be heat treated in order to evolve gases therefrom.

During the sintering process a small portion, for example, one-fourth, of the fluorine is removed. Unless the operating conditions of the sintering process are properly controlled, a clinker of semi-fused material is obtained, and considerable difficulty is encountered in further treating the clinker to remove fluorine therefrom.

The sintered material is broken up into lumps of convenient size, for example, of one inch thickness, and charged to a rotary kiln. The kiln may be heated in a convenient manner, such as by the combustion of oil or powdered coal. In addition to supplying sufficient air to support combustion of the fuel which is sprayed or blown into the hot end of the kiln, an excess of air is directed over the material being heated. The speed of rotation of the kiln is regulated in accordance with other operating factors, but is preferably made such that sintered material introduced into the low temperature end of the kiln will pass therethrough at a rate which will allow it to remain in the hot or calcining zone approximately twenty minutes.

Sufficient fuel is employed to maintain the hot zone of the kiln at a temperature which will depend upon other operating factors of the process but which may preferably be between 1410° C. and 1420° C. Under such conditions, the low temperature end of the kiln will be approximately 1000° C. If the temperature of the hot zone is raised to above 1450° C., or if an insufficient quantity of oxygen is employed, the material being calcined tends to fuse into clinker-like masses which adhere to the lining of the kiln and from which it is difficult to remove fluorine.

In accordance with my process, the fluorine of the rock phosphate is evolved as a gas which passes out of the kiln with the combustion gases, thereby reducing the fluorine of the phosphatic material from its natural content of approximately 3 to 4 per cent to a few tenths of 1 per cent.

The product resulting from proper operation of the above process consists of hard lumps of phosphatic material free from added chemical reagents and toxic quantities of fluorine. The lumps are ordinarily lighter in color than the raw rock phosphate, and present an appearance of incipient fusion which has not progressed sufficiently far to seriously affect the porosity of the particles. Where coal is employed as the carbonaceous material, it will be recognized that a negligible quantity of inert ash will remain. This may be avoided by employing petroleum coke, which has a very small ash residue. The calcined material may be finely ground to a soft, flour-like consistency and employed in various food products. In a preferred modification, which is particularly desirable as poultry food, the calcined rock phosphate is broken up into hard granules and either fed as such or mixed with other food products. In extensive tests it has been found that poultry will consume this product in preference to other phosphatic materials, indicating that my product is considerably more palatable and more digestible than phosphatic materials known heretofore. Apparently, the added ingredients which characterize prior mineral feed prepared from rock phosphate impart some characteristic to the phosphatic material which renders it less desirable as a food. Also, when used as a poultry food, the product of my invention is more effective as a grit than the more soluble rock phosphate products known heretofore. This is partially due to the sharp surfaces presented by the porous structure. The water insoluble character of my product is desirable, since the product does not deteriorate from adsorption of water or from accidental wetting. In addition, the material does not go into solution in the mouth of an animal, and consequently the sharp taste which characterizes prior products is absent. However, when acted upon by the secretions of the digestive organs, the calcium and phosphorus are readily available as a food.

In a preferred form, my process may be modified by combining the sintering and calcining steps into a single operation. In this case the powdered rock phosphate may be mixed with carbon and preferably with an amount of water sufficient to form the material into small lumps. The mixture is then fed into the low temperature end of the kiln operated as described hereinbefore. In traveling through the kiln, the water is evaporated and the carbon burned. The phosphatic material forms into small pellets of a more compact nature than the sintered product. However, by employing an excess of oxygen and properly regulating the rotation of the kiln and the temperature of the hot zone the small pellets of the rock phosphate may be effectively freed from toxic quantities of fluorine.

Where the material is not subjected to a preliminary sintering process, it is less porous and tends to fuse more easily. The use of an excess of oxygen and careful control of the temperature and time of treatment are important to prevent fusion of the phosphatic material into sealed masses from which it is difficult to evolve the fluorine. The time of treatment is preferably such that the material remains in the hot zone approximately twenty minutes. If the supply of oxygen or air is confined to that necessary for complete combustion the time of treatment is necessarily longer and local fusion considerably more pronounced.

I have found that the process may be still further simplified by the omission of carbon from the material which is charged to the kiln. In this case the ground rock phosphate is preferably mixed with water to a mealy consistency and charged to the kiln. Small pellets of about one quarter inch thickness are formed during travel of the material through the kiln, and where an excess of air is employed, fusion is prevented and the fluorine content of the phosphatic material is reduced to a few tenths of 1 per cent. It is desirable to maintain the temperature of the hot zone of the kiln at approximately 1414° C., and the time necessary for effective removal of fluorine at this temperature will be approximately 15 to 25 minutes.

In the latter modification there is a greater dust loss in the kiln, indicating that the carbon in some manner causes cohesion of the particles into a mass sufficiently large to withstand the velocity of the gases passing through the kiln. The fact that efficient fluorine removal may be obtained without carbon indicates that where carbon is employed its function is physical rather than chemical.

In place of powdered carbon may be used liquids, such as petroleum or molasses, or carbonaceous materials, such as sawdust and petroleum, with the result that dust losses are reduced.

The extent of fluorine removal may be regulated by controlling the temperature and time of treatment. I have found that for animal feed the quantity of fluorine should be reduced to 0.5 per cent or lower, and in a preferred modification, the content will be reduced to substantially 0.2 per cent. If the fluorine content of the phosphatic material is below 0.5 per cent, the material may be safely consumed by cattle, poultry and the like without toxic effect.

While I am uncertain as to the form in which the fluorine is evolved, the calcium and phosphorous content of the calcined material remain substantially unchanged when the process is carried out in its preferred form and indications point to the evolution of the fluorine in elemental form.

The above description is for the purpose of illustration and explanation, and is not to be taken as unnecessarily confining the scope of the appended claims.

I claim:

1. A process for treating rock phosphates to render the same suitable for use in animal feed, which comprises providing a finely ground mixture of rock phosphate and carbonaceous material, igniting said carbonaceous material in an oxidizing atmosphere to sinter the rock phosphate, and heating the sintered rock phosphate to a temperature sufficiently high to volatilize a substantial portion of the fluorine content thereof, said heating being effected in the presence of a sufficient excess of oxygen to prevent substantial local fusion due to reducing conditions.

2. A process for treating rock phosphates to render the same suitable for use in animal feed, which comprises providing a mixture of finely divided rock phosphate and a carbonaceous material, sintering said mixture in the presence of an excess of oxygen and at a temperature between 900° C. and 1100° C., breaking up the sintered material into lumps of convenient size, and calcining the sintered lumps at a temperature between 1400° C. and 1450° C., said calcining being effected in the presence of an excess of oxygen.

3. A process for treating rock phosphates to render the same suitable for use in animal feed, which comprises mixing finely divided rock phosphate with a carbonaceous material, and calcining said mixture at a temperature between 1400° C. and 1450° C., said calcining being effected in the presence of a sufficient excess of oxygen to prevent substantial local fusion due to reducing conditions.

4. A process for treating rock phosphates to render the same suitable for use in animal feed, which comprises mixing ground rock phosphate with carbonaceous material and heating said mixture to a temperature sufficiently high to drive off a substantial quantity of the fluorine content of the rock phosphate, said heat being effected in the presence of a sufficient excess of air to prevent substantial local fusion due to reducing conditions and at a temperature below the fusion point of the rock phosphate.

5. A process for treating rock phosphates to render the same suitable for use in animal feed, which comprises calcining finely divided rock phosphate at a temperature between 1400° C. and 1450° C., said calcining being effected in the presence of a sufficient excess of air to prevent substantial local fusion due to reducing conditions.

6. The process which comprises heating finely divided rock phosphate in the presence of a sufficient excess of air to prevent substantial local fusion due to reducing conditions and to a temperature of substantially 1414° C., the time of said heating being substantially twenty minutes.

7. A mineral feed for animals, comprising highly porous substantially water insoluble particles of calcined rock phosphate from which substantially all of the fluorine has been removed.

8. A mineral feed for animals, comprising calcined rock phosphate from which substantially all of the fluorine has been removed, said phosphate being substantially water insoluble and free from added chemical reagents.

9. A poultry food, comprising water-insoluble granules of calcined rock phosphate from which substantially all of the fluorine has been removed.

10. A mineral feed, comprising highly porous and water-insoluble particles of calcined rock phosphate, said particles being substantially free from fluorine and added chemical reagents and containing substantially their original content of calcium and phosphorus.

In testimony whereof I have hereunto subscribed my name.

PAUL CALDWELL.